United States Patent
Aich et al.

[11] Patent Number: 6,086,089
[45] Date of Patent: Jul. 11, 2000

[54] METHOD OF FOLDING A SIDE IMPACT GAS BAG FOR A VEHICLE OCCUPANT RESTRAINT SYSTEM

[75] Inventors: Josef Aich, Hebbach/Lautern; Norbert Lang, Leinzell, both of Germany

[73] Assignee: TRW Occupant Restraint Systems GmbH, Alfdorf, Germany

[21] Appl. No.: 09/001,042

[22] Filed: Dec. 30, 1997

[30] Foreign Application Priority Data

Feb. 7, 1997 [DE] Germany .......................... 197 04 670

[51] Int. Cl.[7] .................. B31B 1/26; B60R 21/16
[52] U.S. Cl. .................... 280/728.1; 280/743.1; 493/231; 493/243
[58] Field of Search ................. 280/728.1, 730.2, 280/732, 743.1; 493/243, 256, 405, 408, 450, 451, 458, 231, 258, 397

[56] References Cited

U.S. PATENT DOCUMENTS

| | | |
|---|---|---|
| 5,240,282 | 8/1993 | Wehner et al. .................. 280/728 |
| 5,300,011 | 4/1994 | Budde et al. . |
| 5,360,387 | 11/1994 | Baker . |
| 5,669,204 | 9/1997 | Blaisdell .................. 53/429 |
| 5,755,078 | 5/1998 | Hurtig, Jr. et al. .......... 53/429 |

FOREIGN PATENT DOCUMENTS

| | | |
|---|---|---|
| 19516494 | 10/1996 | Germany . |
| 19702799 | 12/1997 | Germany . |
| WO9634781 | 11/1996 | WIPO . |

*Primary Examiner*—J. J. Swann
*Assistant Examiner*—Christopher Bottorff
*Attorney, Agent, or Firm*—Tarolli, Sundheim, Covell, Tummino & Szabo L.L.P.

[57] ABSTRACT

A method of folding a side impact gas bag comprises the following steps: First, the gas bag is spread out on a base. Then, the rim of the inflation opening of the gas bag is fixed. Thereafter, a plate is arranged at a predetermined distance from the base and parallel thereto, so that the gas bag lies between the base and the plate. Then, the gas bag is inflated between the base and the plate. Finally, the wall of the gas bag is pushed together from the outside inwards, whereby a portion of the wall of the gas bag is turned into its interior.

13 Claims, 6 Drawing Sheets

METHOD OF FOLDING A SIDE IMPACT GAS BAG FOR A VEHICLE OCCUPANT RESTRAINT SYSTEM

The invention relates to a method of folding a side impact gas bag for a vehicle occupant restraint system, a folded side impact gas bag and a device for folding a side impact gas bag.

BACKGROUND OF THE INVENTION

A restraint system for a vehicle occupant usually consists of a pressure gas source, a release sensor for this and also of a gas bag which is in flow connection with the pressure gas source and after ignition of the pressure gas source can be transferred from a space-saving, folded state into an inflated state, in which it provides a restraint effect for a vehicle occupant.

A range of requirements are placed on the manner in which the gas bag is folded. First, the folded gas bag should be able to be transferred as quickly as possible into the inflated state. Furthermore, the gas bag should be able to be folded automatically. Finally, the gas bag should unfold itself so that no wall parts of the unfolding gas bag strike against a vehicle occupant who is to be restrained.

BRIEF DESCRIPTION OF THE INVENTION

The invention provides a method of folding a side impact gas bag, which can be carried out automatically without manual steps on the one hand, and leads to a folded gas bag which can be unfolded in a particularly advantageous manner on the other hand. According to the invention, the method comprises the following steps: First, the gas bag is spread out on a base. Then, the rim of the inflation opening of the gas bag is fixed. Thereafter, a plate is arranged at a predetermined distance from the base and parallel thereto, so that the gas bag lies between the base and the plate. Then, the gas bag is inflated between the base and the plate. Finally, the wall of the gas bag is pushed together from the outside inwards, whereby a portion of the wall of the gas bag is turned into its interior. In this way, a very compactly folded side impact gas bag is obtained, which nevertheless is easy to unfold. Compared with conventional folding methods, an improvement to the unfolding time of the gas bag was able to be observed. In addition, a more uniform unfolding of the gas bag and also an improved opening behaviour of a cover protecting the folded gas bag was observed. A gas bag folded by the method according to the invention is already positioned in a particularly advantageous manner in the interior of the vehicle during unfolding. By means of the particularly uniform unfolding of the gas bag, its seams and its fabric are less stressed than in gas bags which are folded by conventional methods. Owing to the improved behaviour on unfolding, an impact of wall parts of the unfolding gas bag onto a vehicle occupant who is to be restrained, was only observed to a distinctly smaller extent and with distinctly less energy than in gas bags which are folded by conventional methods. The particular type of folding the gas bag by a method according to the invention particularly supports the special unfolding process in a side impact gas bag, which unfolds predominantly in a single plane, whilst owing to the small depth of the space available it unfolds transversely to this plane only to a comparatively small extent.

According to a preferred embodiment of the method according to the invention, provision is made that in addition the following steps are carried out: First, the wall of the gas bag is turned over along an edge of the gas bag. Then the turned-over part of the wall is fixed in this position. Thereafter, the wall is pushed towards the inflation opening on a second edge of the gas bag substantially perpendicular to the first edge. Thereafter, the wall is pushed towards the inflation opening on a third edge opposite to the first edge of the gas bag. Finally, the wall is pushed towards the inflation opening on a fourth edge opposite to the second edge of the gas bag. With this sequence of the various steps of pushing together the wall of the gas bag, a particularly small packing volume is produced. This is achieved in particular if the wall of the gas bag is turned into its interior before the wall is pushed towards the inflation opening on the third edge of the gas bag.

According to a preferred embodiment of the invention, provision is further made that the wall, starting from a point which lies opposite the point of intersection between the first and the second edge, is pushed towards the centre of the gas bag into its interior. With this sequence of the various method steps, a particularly uniform unfolding of the gas bag is produced. According to the preferred embodiment of the invention, provision is additionally made that an underpressure is applied to the interior of the gas bag during the folding, preferably after turning in the wall. In this way, air is prevented from being enclosed between the individual folds which are forming on pushing together the wall of the gas bag, which would lead to an increased packing volume.

By means of the invention, a folded side impact gas bag for a vehicle occupant restraint system is also provided, which in inflated state has the form of a cushion and is provided with an inflation opening in one of the side faces, characterized in that a part of the wall is turned in the interior of the gas bag. By turning a part of the wall of the gas bag inwards, a particularly small volume of the folded gas bag is obtained.

According to a preferred embodiment, provision is made that the gas bag has a substantially flat upper side and a substantially flat lower side, in the plane of which the inflation opening lies. Furthermore, provision is preferably made that the gas bag has a substantially rectangular periphery. In this way, the gas bag is adapted in an optimum manner to the accommodation spaces usually provided for it to be received, which are substantially rectangular.

According to the preferred form of embodiment, provision is further made that the wall of the gas bag has a plurality of individual folds extending irregularly. Such a gas bag became possible through the knowledge that for an advantageous unfolding of the gas bag during inflation, it is not necessary to fold the gas bag by means of precisely specified, comparatively large folds, as is provided in the prior art. Also with a gas bag which is pushed together, in which the course of the wall in the collapsed state is only roughly given by certain parameters but is not, however, able to be reproduced in detail, a reproducible unfolding process can be achieved on inflation. As no comparatively large folds have to be unfolded on inflation of the gas bag, the unfolding process is carried out particularly quickly.

The invention also provides a device for folding a side impact gas bag for a vehicle occupant restraint system, with a base on which a gas bag to be folded can be spread out, a clamping device by which the rim of the inflation opening can be fixed, a plate which can be arranged parallel to the base and at a distance therefrom, a device for the application of pressure on the interior of the gas bag which is fixed by means of the clamping device, and also with several sliders which are displaceable between a position spaced apart from the periphery of the gas bag unfolded between the base and the plate, and a position in which the wall of the gas bag is pressed in towards its interior, in which the distance between the base and the plate is selected so that the gas bag unfolded between the base and the plate has, compared with the inflated state, a flattened shape. With such a device, a side impact gas bag can be folded automatically with minimal effort. In so doing, the wall of the gas bag is folded so that it unfolds again particularly well.

According to a preferred embodiment, provision is made that the sliders are displaceable in a translatory manner and engage on the gas bag to be folded by a surface perpendicular to the displacement direction. Sliders acting in this way are able to be formed structurally in a particularly simple manner.

According to the preferred embodiment, five sliders are provided, four of which are arranged lying opposite each other in pairs and the fifth extends obliquely to the other sliders. By means of this construction, the wall of the gas bag can be pushed together by means of the four sliders lying opposite each other in pairs in a particularly simple manner to such a size that the gas bag can be inserted into a mounting. By means of the fifth slider, a part of the wall of the gas bag can be turned into its interior.

Further features of the invention will emerge from the subclaims.

BRIEF DESCRIPTION OF THE DRAWINGS

The invention is described hereinbelow with reference to a preferred embodiment, which is illustrated in the enclosed drawings, in which.

DETAILED DESCRIPTION OF THE INVENTION

Figure 1:
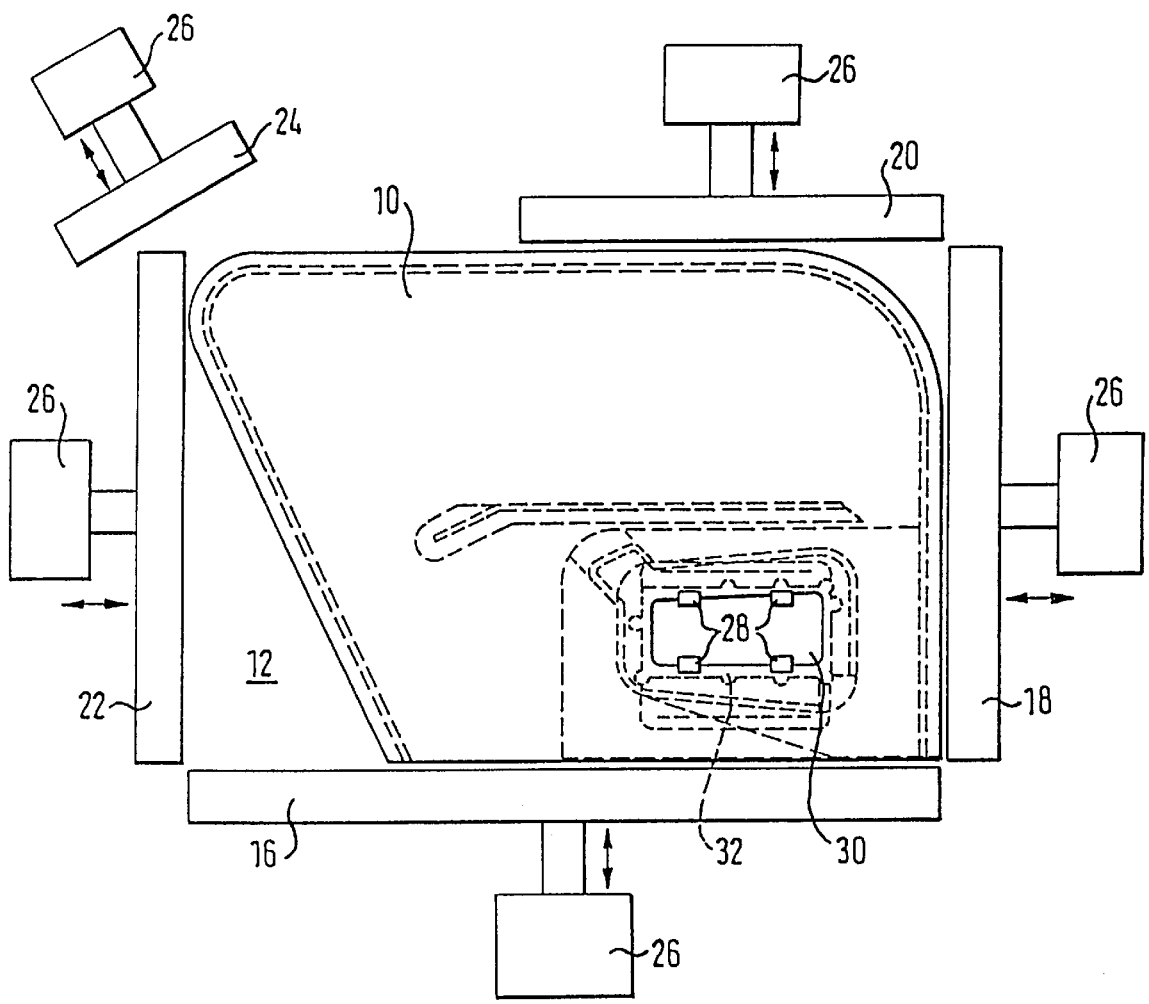
FIG. 1 shows in a diagrammatic top view a gas bag according to the invention, which is arranged in a device according to the invention in order to be folded by a method according to the invention.
Figure 2:
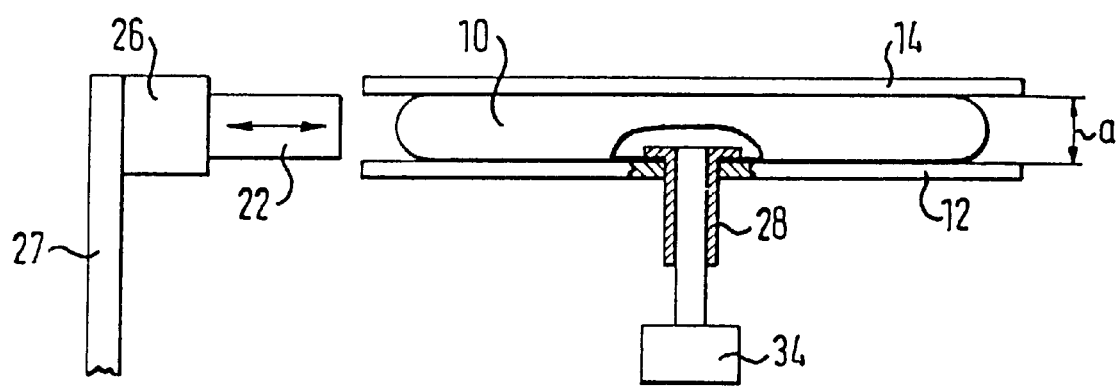
FIG. 2 shows the device of FIG. 1 in a diagrammatic cross-section.

FIGS. 1 and 2 diagrammatically shows a device with which a gas bag 10, likewise illustrated in these Figures, can be folded. This device consists substantially of a base 12, on which the gas bag 10 which is to be folded can be spread out, of a plate 14 which can be arranged parallel to the base 12 and at a distance a therefrom, so that the gas bag 10 which is to be folded is situated between the base 12 and the plate 14, and also of several sliders 16, 18, 20, 22, 24 by which the wall of the gas bag 10 can be pushed together. These sliders can each be moved in a translatory manner with an actuating device 26 which is illustrated diagrammatically, the direction of movement being perpendicular to the surface by which the sliders engage on the wall of the gas bag. The actuating devices 26 are fastened to a machine frame 27 which is illustrated diagrammatically. The device illustrated in FIGS. 1 and 2 contains in addition a diagrammatically illustrated clamping device 28, by which the rim of the inflation opening 30 of the gas bag 10 can be clamped to the base 12. The clamping device 28 can engage here on a holding ring 32 which is placed in the interior of the gas bag and stabilises the inflation opening. The device illustrated in FIGS. 1 and 2 and provided for folding the side impact gas bag contains in addition a pressure application device 34 which is in flow connection with the interior of the gas bag 10.

It is described hereinbelow how a side impact gas bag can be folded by means of the illustrated device and by means of the method according to the invention. First, the gas bag 10 to be folded is spread out on the base 12. Then the rim of its inflation opening 30 is fixed on the base 12 by means of the clamping device 28.

Figure 3:
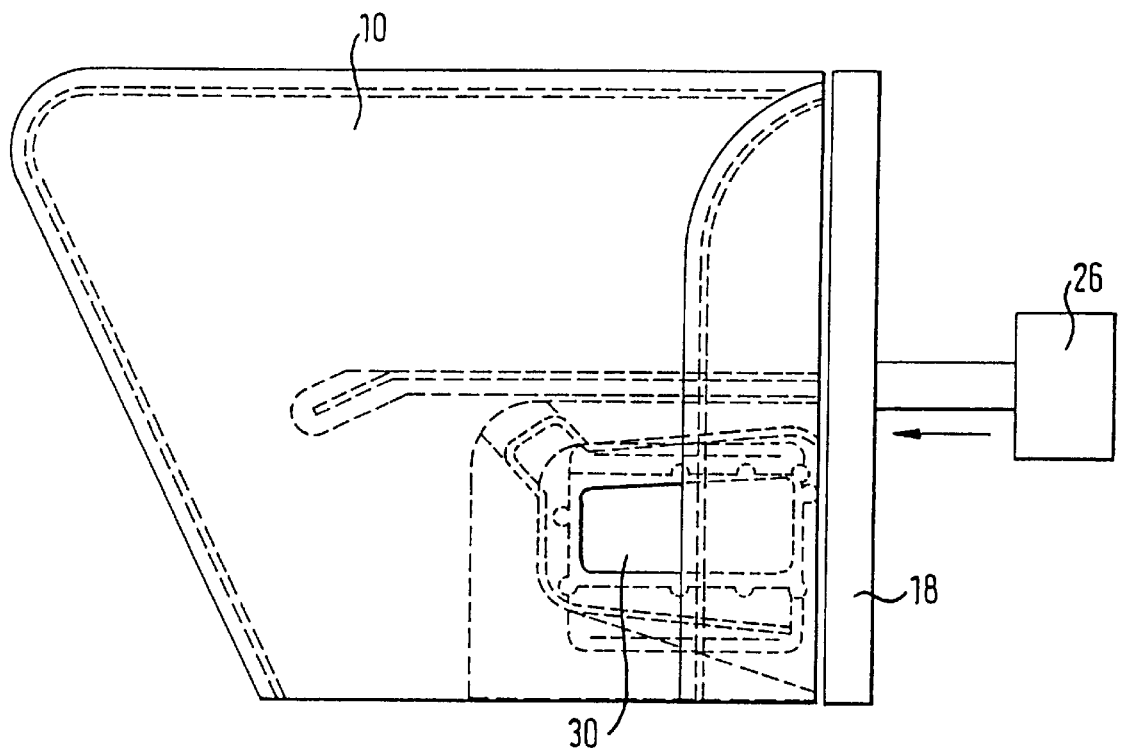
FIG. 3 shows a view corresponding to that of FIG. 1 after a first folding step.

Then a part of the wall is turned over along a first edge of the gas bag. This is illustrated in FIG. 3, in which for better clarity all the elements of the device for folding the gas bag were omitted, which are not required in this step. In the illustrated embodiment, the wall is turned over along the right-hand edge of the gas bag 10, the wall being turned over precisely so far that the new edge of the gas bag which is formed, coincides with the desired exterior contour of the folded gas bag which is to be achieved. In other words, the distance from the new outer edge of the gas bag 10 at the right-hand edge up to for example the centre of the inflation opening corresponds to the distance which also the completely folded gas bag has between the centre of the inflation opening and its right-hand outer edge.

Then the turned part of the wall of the gas bag 10 is fixed in this position on the one hand, this is achieved by pushing the slider 18 forward so far until it lies against the outer edge of the gas bag 10 again. On the other hand, this is achieved by arranging the plate 14 parallel to the base 12 and a distance a therefrom, so that the gas bag 10 to be folded lies between the base 12 and the plate 14. Then the gas bag 10 is unfolded between the base 12 and the plate 14 by means of the pressure application device 34 applying an excess pressure to the interior of the gas bag 10. For the unfolding of the gas bag 10, an excess pressure is used which is less than 100,000 Pa. Preferably an excess pressure in the order of 50,000 Pa is used. By unfolding the gas bag 10 between the base 12 and the plate 14, the turned part of the wall of the gas bag is finally fixed in its position.

Figure 4:
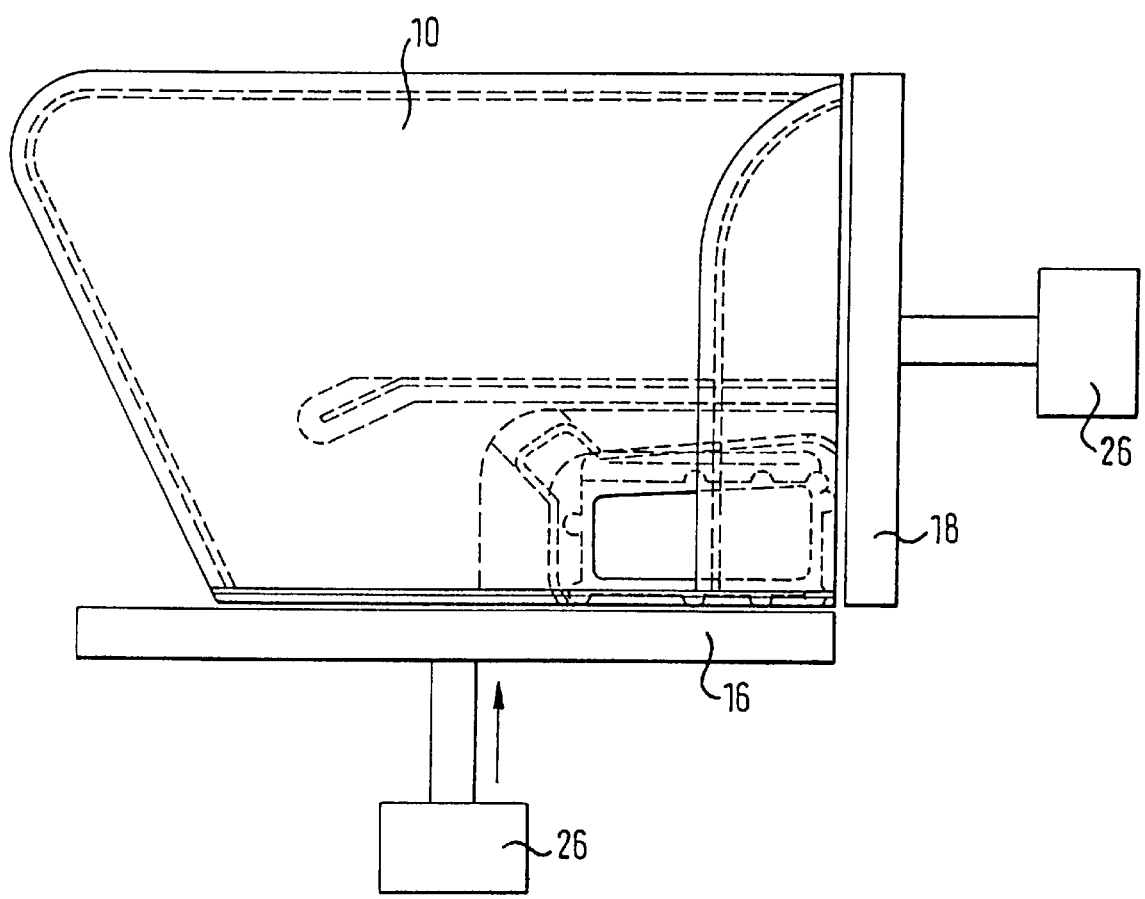
FIG. 4 shows a view corresponding to that of FIG. 3 after a second folding step.

Then the wall of the gas bag 10 is pushed towards the centre of the gas bag on a second edge perpendicular to the first edge, namely the lower edge of the gas bag with respect to the figures. Here also, the wall of the gas bag is pushed together so far that on this edge the desired dimensions of the completely folded gas bag are achieved (see FIG. 4). During pushing the wall of the gas bag together on the second edge by means of the slider 16, a part of the inner volume can escape from the interior of the gas bag via the pressure application device 34, so that no excessively high pressure is built up there.

Figure 5:
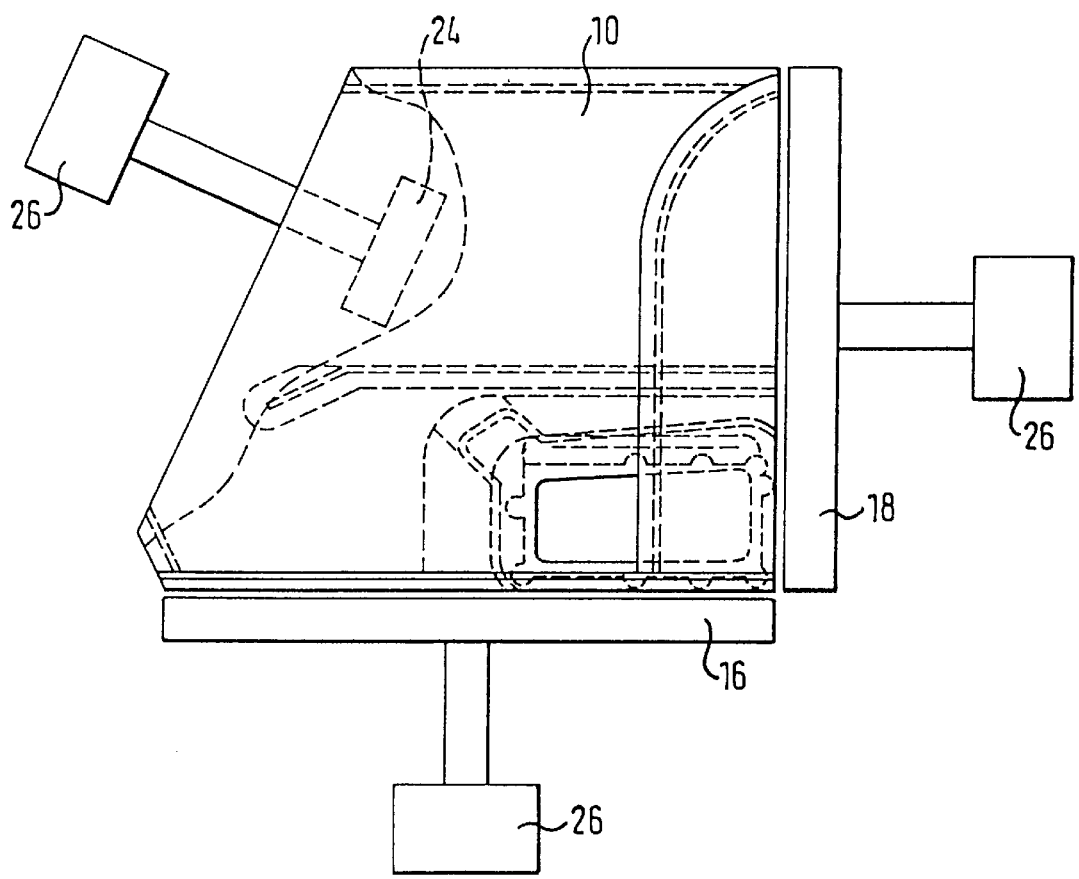
FIG. 5 shows a view corresponding to that of FIG. 4 after a third folding step.

Then a part of the wall, starting from a region which lies approximately diametrically opposite the first and the second edge, is turned into the interior of the gas bag 10 (see FIG. 5). This takes place by means of the slider 24 which is arranged obliquely with respect to the sliders 16, 18 which are perpendicular to each other, and which presses a part of the wall towards the inflation opening of the gas bag. This is possible without difficulty because the gas bag 10 is present in an unfolded state between the base 12 and the plate 14. During the dipping of the slider 24 into the interior of the gas bag, of course again a part of the inner volume of the gas bag can escape therefrom.

Figure 6:
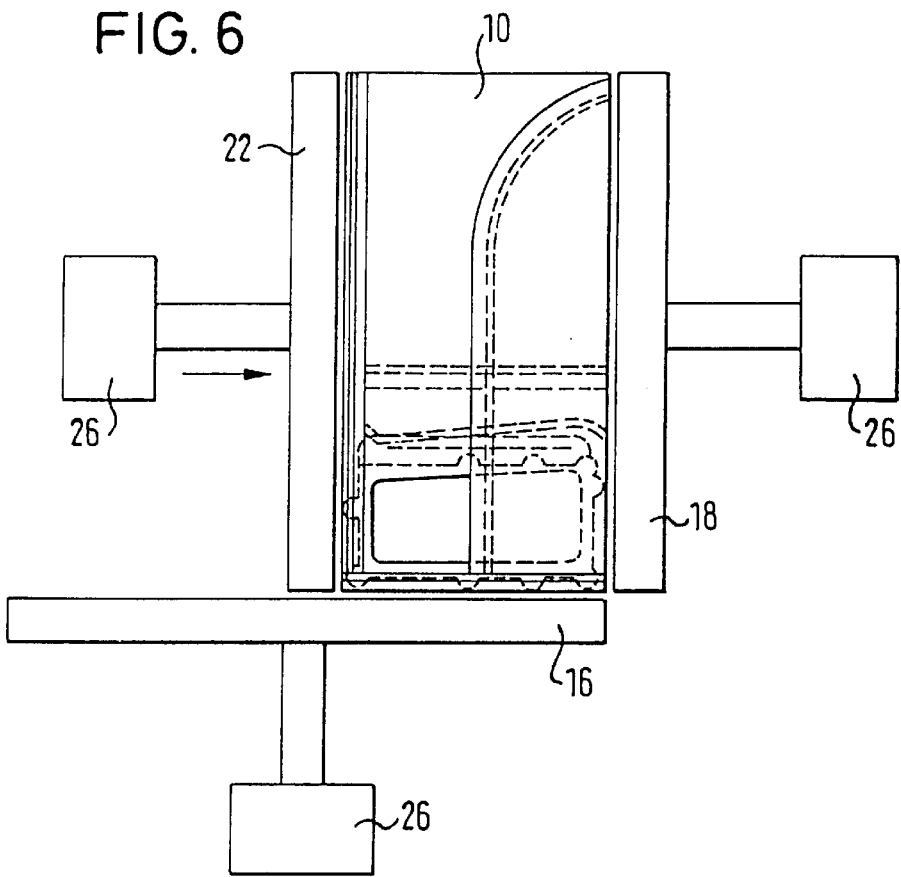
FIG. 6 shows a view corresponding to that of FIG. 5 after a fourth folding step.

After this step, an underpressure is applied to the interior of the gas bag 10, so that it is fixed in the position illustrated in FIG. 5. Then the slider 24 can be drawn out from the interior of the gas bag 10. Thereafter, an edge of the gas bag 10 lying opposite the first edge, i.e. the left-hand edge of the gas bag with regard to the figures, is pushed inwards by means of the slider 22 (see FIG. 6). Here, also, the wall is pushed so far inwards that the final packing size is already reached.

Figure 7:
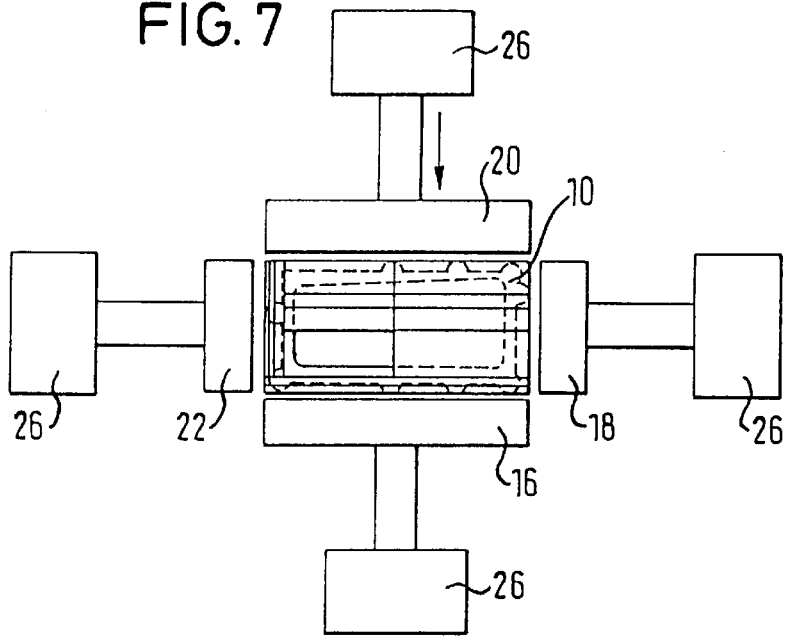
FIG. 7 shows a view corresponding to that of FIG. 6 after a final folding step.

As a final step, the gas bag is pushed inwards on a fourth edge lying opposite the second edge, i.e. the upper edge with respect to the figures, by means of the slider 20. The fourth edge of the gas bag 10 is pushed so far here that the final packing size of the folded gas bag is achieved. This is illustrated in FIG. 7. Here, also, an underpressure is applied to the interior of the gas bag in order to fix the gas bag in the position shown, whilst for example a band is placed around the gas bag. The folded gas bag can then be handled without difficulty. It is also possible to clamp the gas bag 10 to be folded already pre-mounted with a housing on the base 12 so that the gas bag 10, after it has been folded to the packing size which is to be achieved, can be pushed directly into the housing. Then, for example, a covering can be arranged on the housing so that a pre-fabricated structural group with a folded gas bag is obtained.

The gas bag folded in the manner illustrated is distinguished in that its wall is arranged in a plurality of small irregular individual folds. Only the basic distribution of the wall is given and is reproducible at any time by means of the part of the wall which is turned into the interior of the gas bag and by means of the turned-over part of the wall. Depending on the selected direction for turning a part of the wall into the interior of the gas bag by means of the slider 26, and depending on the size of the turned-in wall part, the method according to the invention for folding a gas bag can be adapted to any side impact gas bag which is to be folded and to the respectively existing installation conditions for this side impact gas bag.

What is claimed is:

1. A method of folding a side impact gas bag for a vehicle occupant restraint system, said gas bag, in an inflated state, having the form of a cushion with side faces and having a wall provided, in one of said side faces, with an inflation opening having a rim, the method comprising the following steps:

said gas bag is spread out on a base;

said rim of said inflation opening of said gas bag is fixed;

a plate is arranged at a predetermined distance from said base and parallel thereto so that said gas bag lies between said base and said plate;

said gas bag is inflated between said base and said plate;

said wall of said gas bag is pushed together from the outside inwards, whereby a part of said gas bag wall is turned into the interior of said gas bag.

2. The method of claim 1, wherein an underpressure is applied to the interior of said gas bag during folding.

3. The method of claim 2, wherein said underpressure is applied to the interior of said gas bag after turning in said wall.

4. The method of claim 1, wherein the interior of said gas bag is acted upon by an excess pressure of less than 100000 Pa so that said gas bag unfolds between said base and said plate.

5. The method of claim 4, wherein the interior of said gas bag is acted upon by a pressure of approximately 50000 Pa.

6. The method of claim 1, wherein gas contained in the interior of said gas bag after applying excess pressure can escape during pushing said wall together.

7. The method of claim 1, wherein said rim of said inflation opening is secured in an accommodation provided for said folded gas bag.

8. The method of claim 7, wherein said wall of said gas bag is in each case pushed so far towards said inflation opening that said folded gas bag can be inserted directly into said accommodation.

9. The method of claim 8, wherein said gas bag is inserted directly into said accommodation after folding.

10. The method of claim 1, wherein said gas bag is fixed in its state after folding.

11. The method of claim 1, wherein said predetermined distance between said base and said plate corresponds approximately to a packing height of said folded gas bag.

12. A method of folding a side impact gas bag for a vehicle occupant restraint system, said gas bag, in an inflated state, having the form of a cushion with side faces and having a wall provided, in one of said side faces, with an inflation opening having a rim, the method comprising the following steps:

said gas bag is spread out on a base;

said rim of said inflation opening of said gas bag is fixed;

a plate is arranged at a predetermined distance from said base and parallel thereto so that said gas bag lies between said base and said plate;

said gas bag is inflated between said base and said plate;

said wall of said gas bag is pushed together from the outside inwards, whereby a part of said gas bag wall is turned into the interior of said gas bag;

said wall of said gas bag is turned over along a first edge of said gas bag;

said turned-over part of said wall is fixed in this position;

said wall is pushed towards said inflation opening on a second edge of said gas bag substantially perpendicular to said first edge;

said wall on a third edge opposite to said first edge of said gas bag is pushed towards said inflation opening; and said wall on a fourth edge opposite to said second edge of said gas bag is pushed towards said inflation opening.

13. The method of claim 12, wherein said wall, starting from a point which lies opposite a point of intersection between said first and said second edges, is pushed into the interior of said gas bag towards its centre.

* * * * *